United States Patent

Rekuc et al.

Patent Number: 5,365,642
Date of Patent: *Nov. 22, 1994

[54] SNAP HOOK ASSEMBLY

[75] Inventors: Richard J. Rekuc, Pattenburg; James O'Shea, Annandale, both of N.J.

[73] Assignee: Royalox International, Inc., Philipsburg, N.J.

[*] Notice: The portion of the term of this patent subsequent to Oct. 19, 2010 has been disclaimed.

[21] Appl. No.: 100,098

[22] Filed: Jul. 29, 1993

Related U.S. Application Data

[63] Continuation-in-part of Ser. No. 7,592, Jan. 22, 1993, Pat. No. 5,253,396.

[51] Int. Cl.$^5$ .............................................. A44B 13/00
[52] U.S. Cl. ................................. 24/600.9; 24/598.7; 24/600.7; 24/905
[58] Field of Search ................. 24/600.9, 600.1, 600.6, 24/600.5, 601.5, 601.7, 598.9, 599.6, 598.5, 265 H

[56] References Cited

U.S. PATENT DOCUMENTS

| | | | |
|---|---|---|---|
| 404,659 | 6/1889 | Sears et al. | 24/600.9 |
| 450,818 | 4/1891 | Smith | 24/600.9 |
| 647,734 | 4/1900 | Wells, Jr. | 24/600.9 |
| 893,448 | 7/1908 | Covert | 24/600.9 |
| 959,116 | 5/1910 | Covert | 24/600.9 |
| 1,804,377 | 5/1931 | Freysinger | 24/600.9 |
| 2,163,420 | 6/1939 | Wells | 24/905 |
| 4,577,374 | 3/1986 | Lii | 24/265 H |
| 5,253,396 | 10/1993 | Rekuc et al. | 24/600.9 |

*Primary Examiner*—Victor N. Sakran
*Attorney, Agent, or Firm*—Herbert Dubno

[57] ABSTRACT

A swivel snap hook assembly in which avoids drawbacks of deforming an opening through which the post of the swivel has been inserted to retain the had of the post, the post is received in a cavity of the hook or web loop member and is retained against lateral withdrawal by a cover affixed to the member formed with the cavity. The cavity and the cover have shoulders engaging the shoulder of the head to prevent axial withdrawal of the post.

7 Claims, 3 Drawing Sheets

SNAP HOOK ASSEMBLY

CROSS REFERENCE TO RELATED APPLICATION

This is a continuation-in-part of Ser. No. 08/007,592 filed Jan. 22, 1993, now U.S. Pat. No. 5,253,396 issued Oct. 19, 1993.

FIELD OF THE INVENTION

The present invention relates, in general, to snap hooks, and, more particularly, to snap hooks provided with web loops.

BACKGROUND OF THE INVENTION

Normally, there are two methods used to attach the swivel portion of the body of a snap hook to the web loop.

In the first method, the body of the snap hook is provided with a stud having a ball or T formation at the end thereof defining the swivel, which fits through a circular opening of a collar formed on the frame of the web loop. The collar is then compressed into an oval shape, thus preventing the ball or T from being removed. The web loop can now rotate on the swivel without separating therefrom.

The drawback associated with this first embodiment is that in time, stress causes the oval shape of the collar to become come circular again, thus allowing the web loop to separate from the swivel of the snap hook.

In the second method, the web loop is again formed with a circular collar on the frame of the loop. However, the snap hook swivel is formed by a stud extending through the collar and fitted with a cap or lock washer which is larger than the circular opening, thus preventing separation of the web loop from the snap hook and allowing the loop to rotate on the swivel without separation from the hook.

The drawback associated with the second embodiment is that in time, stress causes the cap or lock washer to loosen and finally to separate from the stud.

OBJECTS OF THE INVENTION

It is therefore an object of the present invention to provide an improved snap lock assembly which will obviate the aforementioned drawbacks.

It is another object of the present invention to provide a snap lock assembly in which the web loop will not separate from the snap hook swivel due to accumulated stress.

A further object of the invention is to extend the principles of the above mentioned copending application.

SUMMARY OF THE INVENTION

The above and other objects are attained in a snap hook assembly in which the web loop is provided with a swivel having either a ball or disk formation at the end of a stud. A portion of the body of the snap hook is formed in two halves divided along a longitudinal plane, one half being unitary with the hook and a cover member being connectable therewith. A cavity adapted to receive the swivel formation is formed at the longitudinal plane, occupying equal space in each snap hook half.

In assembly, the swivel formation is positioned in one of the cavities and the two halves brought together and fastened by a pair of studs extending from the hook half through the cover member and spread by a stud spinner. The web loop is now rotatably connected with the snap hook body in a manner which precludes any separation therefrom due to stress, the collar being eliminated and the body of the snap hook providing a distortion-free support for the web loop.

In more general terms a swivel snap hook assembly according to the invention can comprise:
an elongated web loop member;
a snap hook having a base member, a hook portion extending from the base member, and a spring-biased finger pivotal on the base member and normally closing the hook portion; and
a swivel connecting the base member with the web loop member, the swivel comprising:
a post fixed on one of the members and formed at a free end thereof with an enlarged head,
an undercut cavity formed in the other of the members rotatably receiving the post and having a shoulder engaging a shoulder of the post for preventing the post from withdrawing axially from the cavity,
a cover extending over the cavity and provided with a recess receiving the head for preventing lateral withdrawal of the pin from the cavity, and
means for securing the cover to the other member.

As will be apparent, the undercut cavity and cover can be formed on the web loop in one embodiment of the invention, in which case the post with its enlarged head is provided on the base of the snap hook.

Alternatively, the undercut cavity and its cover can be provided in the body or base of the snap hook while the post is provided on the web loop.

In either embodiment, the had can be cylindrical or ball shaped and thus is formed with a shoulder engageable with a complementary shoulder of the cavity.

The cover can, as indicated, have a cavity which matches that of the first mentioned cavity to completely surround an enclose the head with a minimum of play except for rotation of the head in the cavities.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
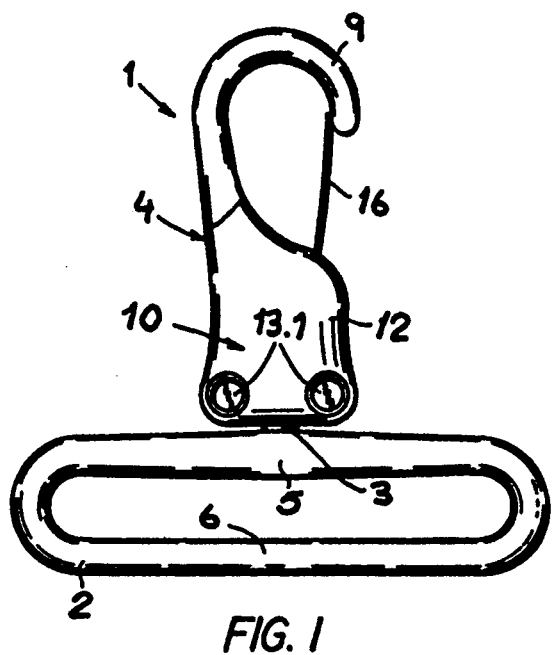
FIG. 1 is a front elevational view a snap hook assembly according to the invention.
Figure 2:
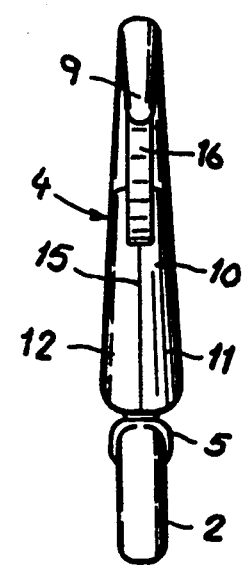
FIG. 2 is a right side elevational view thereof.
Figure 3:
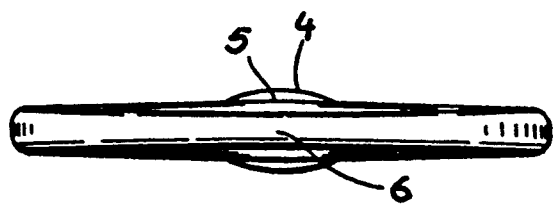
FIG. 3 is a bottom plan view thereof.

Referring to FIGS. 1–3 of the drawing, the snap hook assembly 1 is provided with an elongated web loop 2 having a swivel 3 extending therefrom into the body 4 of the snap hook. The central portion 5 of the frame of the web loop 2 from which the swivel 3 extends is both wider and thicker than the opposite central side 6 of the frame. The swivel 3 is formed by a stud 7 having a ball 8 formed at the end thereof.

Figure 4:
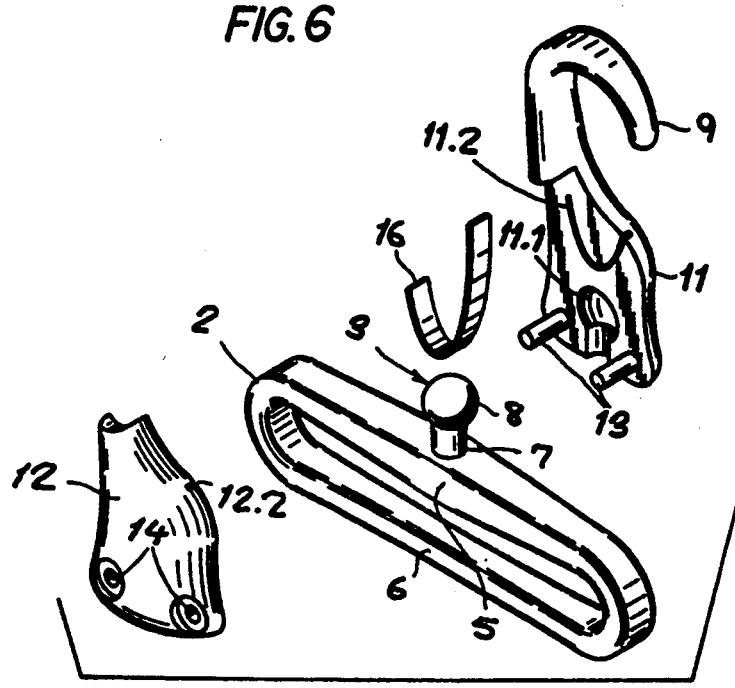
FIG. 4 is an exploded perspective view thereof.
Figure 5:
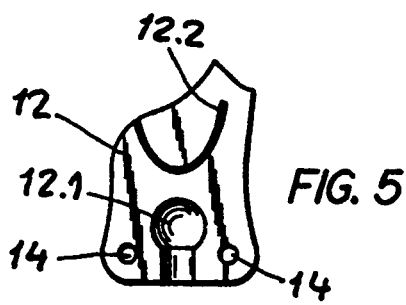
FIG. 5 is an elevational view of the inside face of the cover member shown in FIG. 1.

The body 4 of the snap hook extends generally transverse to the web loop 2 and has a hook portion 9 which extends into a split portion 10 having one half 11 unitary with the hook portion 9 and a cover member half 12 which attaches to the half 11 by means of studs 13 extending from the half 11 and traversing openings 14 formed in cover member 12, shown with particularity in FIGS. 4 and 5, where they are spread by a stud spinner to form heads 13.1.

The two halves are joined along a longitudinal plane 15, and each half is formed with a respective hemispherical half cavity 11.1 and 12.1 opening at the plane 15, which when the halves are joined, form a spherical cavity adapted to receive and rotatably hold the swivel 3. The halves are also formed with respective arcuate recesses or grooves 11.2 and 12.2 opening at the plane 15 and adapted to receive a leaf spring 16, which engages the inner surface of the hook portion 9.

Figure 8:
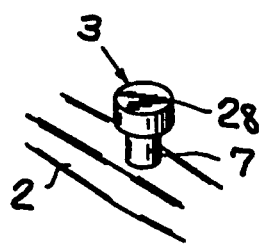
FIG. 8 is a perspective view of an alternative swivel formation.

As mentioned earlier, the swivel 3 can alternatively have a disk formation 28, as shown in FIG. 8.

Figure 6:
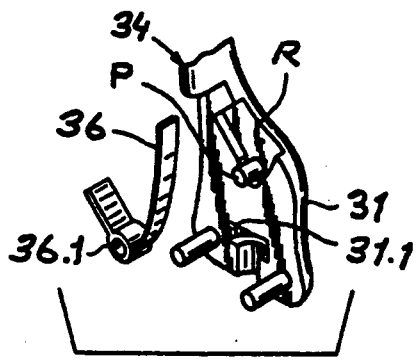
FIG. 6 is an exploded perspective view of a portion of another embodiment of the invention.
Figure 7:
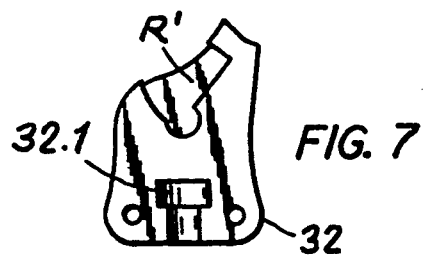
FIG. 7 is an elevational view similar to FIG. 5 of the inside face of a cover member to be used in the embodiment shown in FIG. 6.

In another embodiment of the invention shown in FIGS. 6 and 7, the snap hook has a body 34 formed with a unitary half 31 provided with a pivot pin P disposed in a recess R and upon which the hub 36.1 of a leaf spring 36 is fitted, the respective recesses R of half 31 and R' of cover member 32 being adapted to receive the leaf spring 36. Each half of the split portion 31 and 32 is formed with a respective half cylindrical cavity 31.1 and 32.1, which when joined together form a cylindrical cavity. In all other respects, this alternative embodiment of the invention is identical to the first embodiment.

Figure 9:
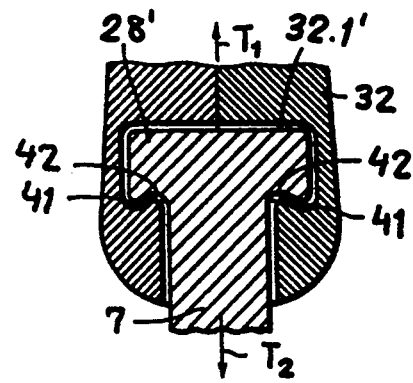
FIG. 9 is a cross sectional view through a stud formed with camming surfaces drawing opposite sides of the hole together.

The stud head 28' can have a concavity with an inwardly converging flank 42 (FIG. 9) cooperating with flanks 41 forming a concave slope of the hole. In this case a thrust in the direction of arrows $T_1$, $T_2$ can cause the flanks 41, 42 to engage and form cam means which will draw the sides of the hole toward one another. Hence the tendency of the head to spread the hole can be effectively countered.

As can be seen from FIGS. 10a, 10b, 10c, and 11, the invention is equally applicable to a kinematic reversal of the members of the swivel from the embodiments of FIGS. 1–8 previously described.

Figure 10A:
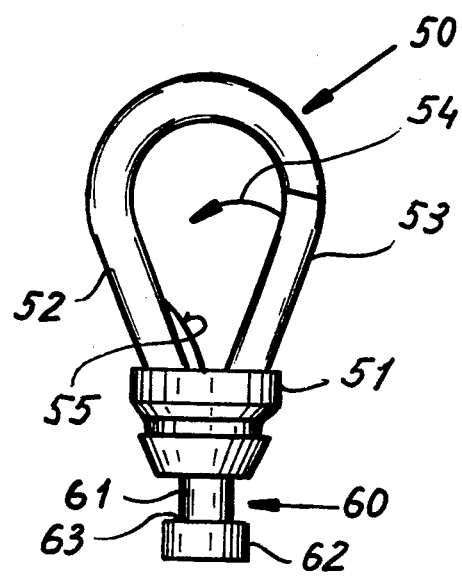
FIG. 10a is an elevational view of a snap hook portion of the swivel snap hook assembly of the invention in another embodiment.
Figure 10B:
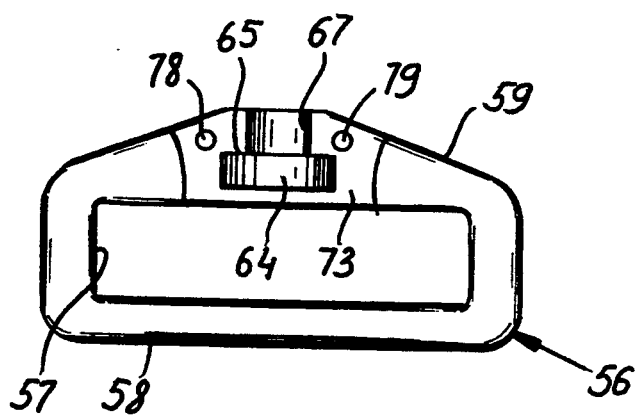
FIG. 10b is an elevational view of the web loop thereof with the cover removed.
Figure 10C:
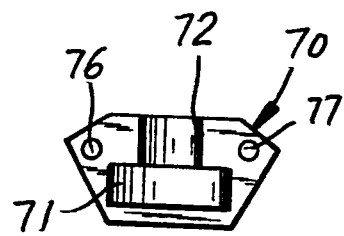
FIG. 10c is an elevational view of the cover from the side thereof enabling its recess to be seen.
Figure 11:
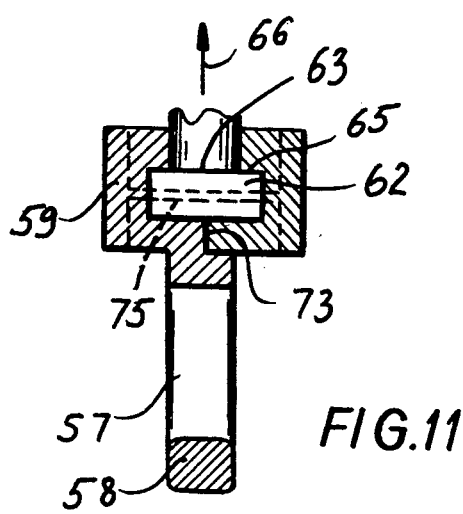
FIG. 11 is a cross sectional view through the assembly taken perpendicular to the plane of the web loop through the center thereof.

More particularly, the assembly can comprise a snap hook 50 which has a base 51, a hook portion 52 ridged with and preferably integral with the base, a finger 53 pivotally connected to the hook portion 52 at the base 51 so that it can swing inwardly as represented by the arrow 54, and a leaf spring 55 shown only partly in FIG. 10a and which serves to bias the finger 53 into its closed portion.

The other major part of the assembly is a web loop 56 having an opening 57 through which a belt, web or strip can pass and which can bend or loop around a bar 58 framing the opening 57 at its side opposite the enlargement side 59 adopted form part of the swivel.

The swivel can be formed by a pin 60 formed on and unitary with the base 51 of the snap and consisting of a shank 61 and a cylindrical head 62 formed with a shoulder 63 at the junction of the head with the shank. Alternatively, the head may be a base as has been described, in which case the shoulder is formed by the sloping flanks of the ball extending away from the shank 61.

To receive this pin, the bar 59 of the web loop 56 is formed with a cavity 64 which is of semicylindrical shape, complementary to the head 62 and is undercut to provide a shoulder 65 which can engage the shoulder 63 of the head 62 and prevent the pin from being withdrawn from the cavity in the axial direction represented by the arrow 56.

The cavity 64 is connected to a cylindrical trough 67 which matches the shank 61 to enable rotation of the pin in the cavities. The cavities 64 and 67 are covered by the cover member 70 shown in FIG. 10c and which has cavities 64 and 67, also engaging the pin 60 to resist withdrawal, and fitting into a set back 73 of the arm 59.

The cover is held in place by force fitted pins or rivets as represented as 75 and extending through holes 76, 77 of the cover and matching holes 78 and 79 of the web loop member.

The swivel snap hook assembly of FIGS. 10a–10c and 11, therefore operates in the same manner as the assembly of FIGS. 1–8.

We claim:

1. A swivel snap hook assembly, comprising:
   an elongated web loop member;
   a snap hook having a base member, a hook portion extending from said base member, and a spring-biased finger pivotal on said base member and normally closing said hook portion; and
   a swivel connecting said base member with said web loop member, said swivel comprising:
   a post fixed on said base member and formed at a free end thereof with an enlarged head,
   an undercut cavity formed in said web loop member rotatably receiving said post and having a shoulder engaging a shoulder of said post for preventing said post from withdrawing axially from said cavity,
   a cover extending over said cavity and provided with a recess receiving said head and having a shoulder engaging said shoulder of said post for preventing lateral withdrawal of said post from said cavity, and
   means for securing said cover to said other member.

2. The swivel snap hook assembly as defined in claim 1 wherein said head is cylindrical and said cavity and said recess are respectively semicylindrical.

3. The swivel snap hook assembly as defined in claim 1 wherein said head and generally spherical and said cavity and said recess are generally hemispherical.

4. The swivel snap hook assembly as defined in claim 1 wherein said means for securing said cover to said other member includes pins extending through a pair of holes in said cover and a pair of holes of said other member aligned with said pair of holes of said cover.

5. The swivel snap hook assembly as defined in claim 1 wherein said means for securing said cover to said other member includes screws attaching said cover to said other member.

6. The swivel snap hook assembly as defined in claim 1 further comprising a leaf spring acting upon said finger and anchored between said cover and said other member.

7. The swivel snap hook assembly as defined in claim 1, further comprising cam means formed by said shoulders for drawing said cover toward said web loop member upon application of a pulling force to said post.

* * * * *